US011131864B2

(12) United States Patent
Ferri

(10) Patent No.: US 11,131,864 B2
(45) Date of Patent: Sep. 28, 2021

(54) HOLOGRAPHIC DISPLAY WITHIN A VEHICLE EXTERNAL PART

(71) Applicant: MAGNA CLOSURES INC., Newmarket (CA)

(72) Inventor: James J. Ferri, Maple (CA)

(73) Assignee: MAGNA CLOSURES, INC., Newmarket (CA)

( * ) Notice: Subject to any disclaimer, the term of this patent is extended or adjusted under 35 U.S.C. 154(b) by 243 days.

(21) Appl. No.: 16/376,256

(22) Filed: Apr. 5, 2019

(65) Prior Publication Data

US 2019/0310486 A1   Oct. 10, 2019

Related U.S. Application Data

(60) Provisional application No. 62/653,835, filed on Apr. 6, 2018, provisional application No. 62/699,042, filed on Jul. 17, 2018.

(51) Int. Cl.
*G03H 1/00* (2006.01)
*G02B 30/25* (2020.01)
(Continued)

(52) U.S. Cl.
CPC .............. *G02B 30/25* (2020.01); *B60K 35/00* (2013.01); *G03H 1/0005* (2013.01); *G03H 1/2286* (2013.01)

(58) Field of Classification Search
CPC ........ G02B 30/25; G02B 30/56; G02B 30/00; G02B 27/0103; B60K 35/00; B60K 2370/797; B60K 2370/29; G03H 1/2286;
G03H 1/0005; G03H 1/22; G03H 2210/62; G03H 2222/31; G03H 2223/18; G03H 2223/24; G03H 2227/02;
(Continued)

(56) References Cited

U.S. PATENT DOCUMENTS 2,967,905 A * 1/1961 Hirsch ........................... 348/51
5,053,755 A * 10/1991 Smith ................ G02B 27/0101
345/7
(Continued)

FOREIGN PATENT DOCUMENTS

EP        0870655 A1   10/1998
EP        1270324 A2    1/2003
WO   WO2009095883 A1    8/2009

*Primary Examiner* — Jennifer D. Carruth
(74) *Attorney, Agent, or Firm* — Honigman, LLP

(57) ABSTRACT

A holographic display device presents a holographic image within an external part for a vehicle such as a headlight assembly or an exterior rearview mirror assembly. An outer cover defines an interior cavity, with a transparent portion, such as a window, allowing a viewer to see into the interior cavity. A presentation surface inside the interior cavity is illuminated by an image source to display the holographic image, which appears as a 3-dimensional object within the interior cavity, and which appears to be suspended therein. The holographic image may be stationary or moving, and may include a logo, symbol, or other graphic. The image source is may be hidden from direct view. One embodiment includes two circular polarizer to prevent light directly from the image source from being visible, while allowing reflected light to become visible by being having the polarization direction reversed.

11 Claims, 16 Drawing Sheets

(51) Int. Cl.
*B60K 35/00* (2006.01)
*G03H 1/22* (2006.01)

(58) Field of Classification Search
CPC ... G03H 2001/2242; G03H 2001/2236; G03H 2210/30; G09F 21/04; B60Q 1/0017; B60R 1/12; B60R 2001/1215
See application file for complete search history.

(56) References Cited

U.S. PATENT DOCUMENTS

| | | |
|---|---|---|
| 7,850,351 B2 | 12/2010 | Pastrick et al. |
| 8,696,179 B2 | 4/2014 | Pastrick |
| 2014/0266986 A1* | 9/2014 | Magyari ............ G02B 27/0172 345/8 |
| 2016/0147070 A1* | 5/2016 | Border ................ G02B 27/126 359/633 |
| 2016/0170208 A1* | 6/2016 | Border ............... G02B 27/0093 359/471 |
| 2016/0195719 A1* | 7/2016 | Yonetani ................ B60K 35/00 359/631 |
| 2016/0327790 A1* | 11/2016 | Kasano ................ H04N 13/344 |
| 2020/0055395 A1* | 2/2020 | Nakamura .......... G02B 27/0149 |
| 2020/0286412 A1* | 9/2020 | Steele ..................... G09F 19/12 |

* cited by examiner

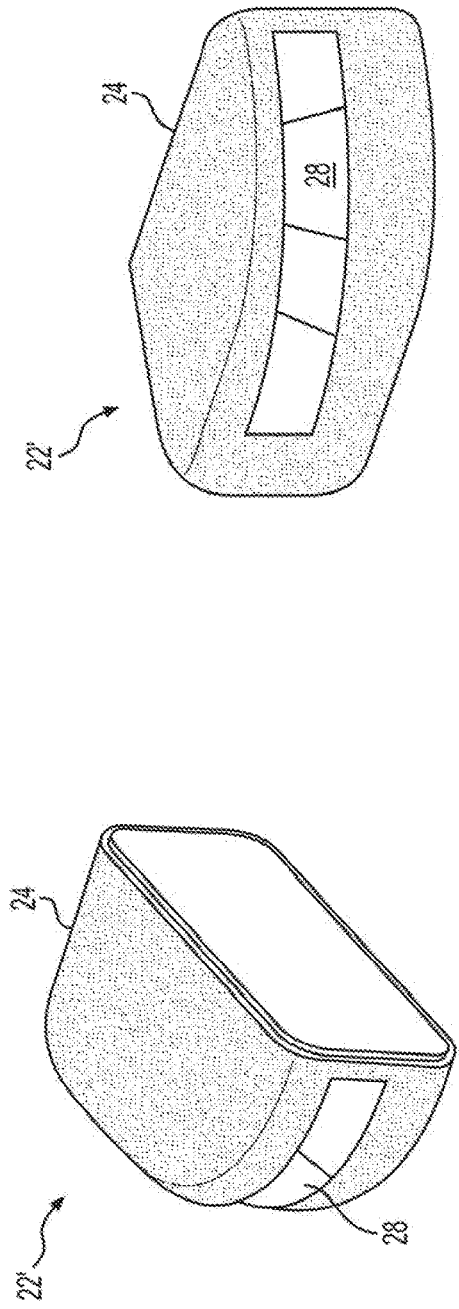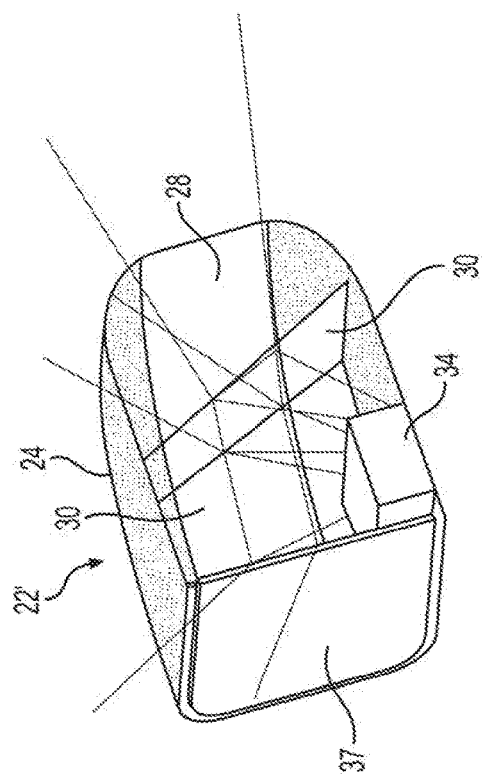

HOLOGRAPHIC DISPLAY WITHIN A VEHICLE EXTERNAL PART

CROSS-REFERENCE TO RELATED APPLICATIONS

This application claims the benefit of U.S. Provisional Application No. 62/653,835 filed Apr. 6, 2018, and U.S. Provisional Application No. 62/699,042 filed Jul. 17, 2018. The entire disclosure of the above applications are incorporated herein by reference.

FIELD

The present disclosure relates generally to a holographic display device presenting a holographic image.

BACKGROUND

Vehicles such as passenger cars and trucks include a number of external parts such as headlights and external rearview mirrors. Much attention is given to the aesthetic and styling features of those external parts, which substantially impacts the overall styling of the vehicle. The aesthetic and styling features of the vehicle can be improved with the display of images in the external part. Furthermore, the ability to display images in an external part of a vehicle can be used to communicate information.

SUMMARY

This section provides a general summary of some of the objects, advantages, aspects and features provided by the inventive concepts associated with the present disclosure. However, this section is not intended to be considered an exhaustive and comprehensive listing of all such objects, advantages, aspects and features of the present disclosure.

In one aspect, the present disclosure is directed to a holographic display device including an external part configured to be installed on an external portion of a vehicle. The external part includes an outer cover defining an interior cavity and including a transparent portion. A presentation surface is disposed within the interior cavity and is illuminated by an image source to present a holographic image which is visible through the transparent portion of the outer cover.

In another aspect, the present disclosure is directed to a holographic display device including two circular polarizers to prevent the viewing of light coming directly from an image source while allowing the viewing of light from the image source which was reflected off a presentation surface. More specifically, a holographic display device according to an aspect of the present disclosure includes an image source having a light source generating a first beam of unpolarized light. A first circular polarizer including a linear polarizer and a quarter-wave plate together create circularly polarized light having a circular polarization in a first direction from the first beam of unpolarized light. A reflective component is configured to reflect the circularly polarized light from the first circular polarizer to a second beam having a circular polarization in a second direction opposite the first direction. An optical cover is disposed between the reflective component and a viewer and includes a second circular polarizer, which is transmissive to light having a circular polarization in the second direction and which is not transmissive to light having a circular polarization in the first direction.

In another aspect there is provided a holographic display device including an image source including a light source generating a first beam of unpolarized light, a first polarizer creating polarized light having a polarization in a first direction from the first beam of unpolarized light, a reflective component configured to reflect the polarized light from the first polarizer to a second beam having a polarization in a second direction different than the first direction, and an optical cover disposed between the reflective component and a viewer, the optical cover including a second polarizer transmissive to light having a polarization in the second direction and not transmissive to light having a polarization in the first direction.

In another aspect, the present disclosure is directed to an external part for a vehicle that includes a holographic display device. More specifically, the holographic display device includes an image source and a reflective component that is configured to present a holographic image within the external part. The image source includes a light source generating a first beam of unpolarized light. A first circular polarizer including a linear polarizer and a quarter-wave plate together create circularly polarized light having a circular polarization in a first direction from the first beam of unpolarized light. The reflective component is configured to reflect the circularly polarized light from the first circular polarizer to a second beam having a circular polarization in a second direction opposite the first direction. An optical cover is disposed between the reflective component and a viewer and includes a second circular polarizer, which is transmissive to light having a circular polarization in the second direction and which is not transmissive to light having a circular polarization in the first direction.

BRIEF DESCRIPTION OF THE DRAWINGS

Further details, features and advantages of designs of the invention result from the following description of embodiment examples in reference to the associated drawings.

FIG. 11A is a perspective view of another embodiment for a holographic display device within an exterior rearview mirror assembly;

FIG. 11B is another perspective view of the exterior rearview mirror assembly of FIG. 11A;

FIG. 11C is a cutaway perspective view of the exterior rearview mirror assembly of FIG. 11A;

DETAILED DESCRIPTION

Figure 1:
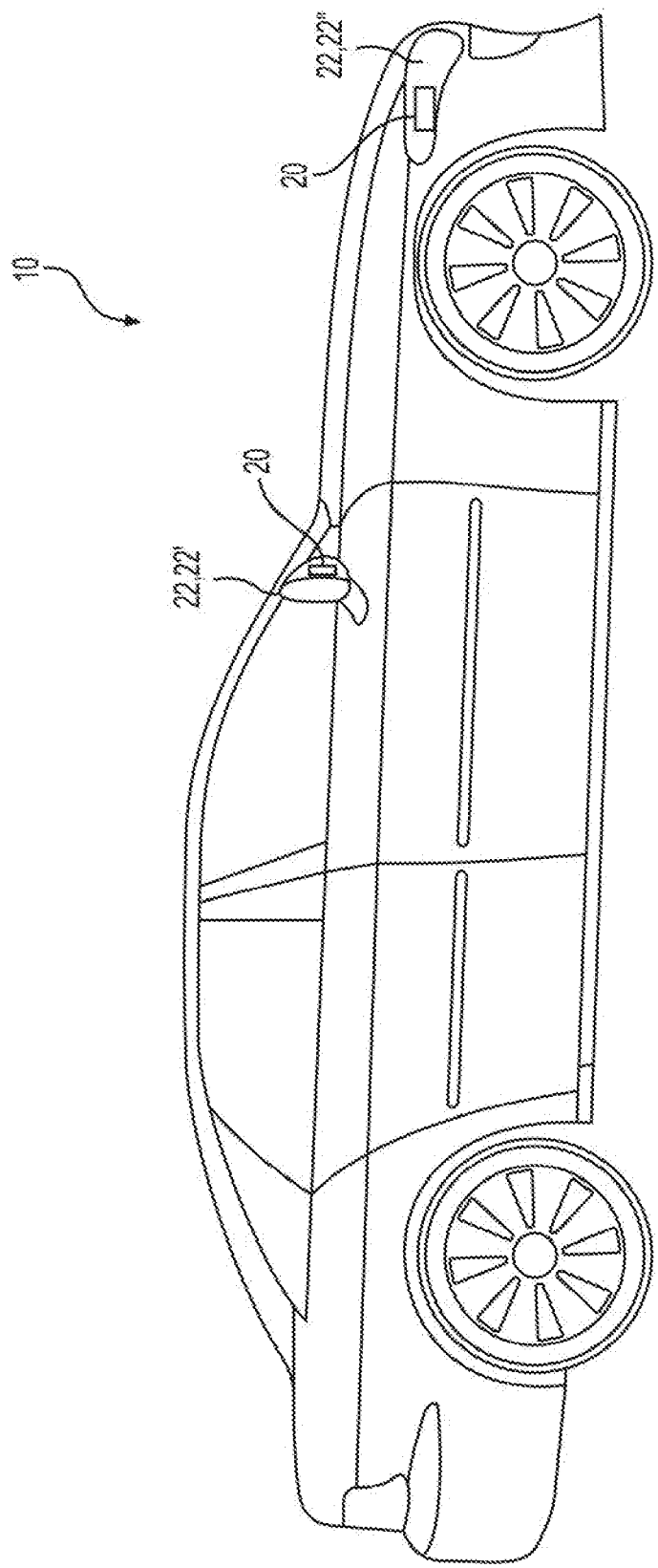
FIG. 1 is a side view of a vehicle.
Figure 2:
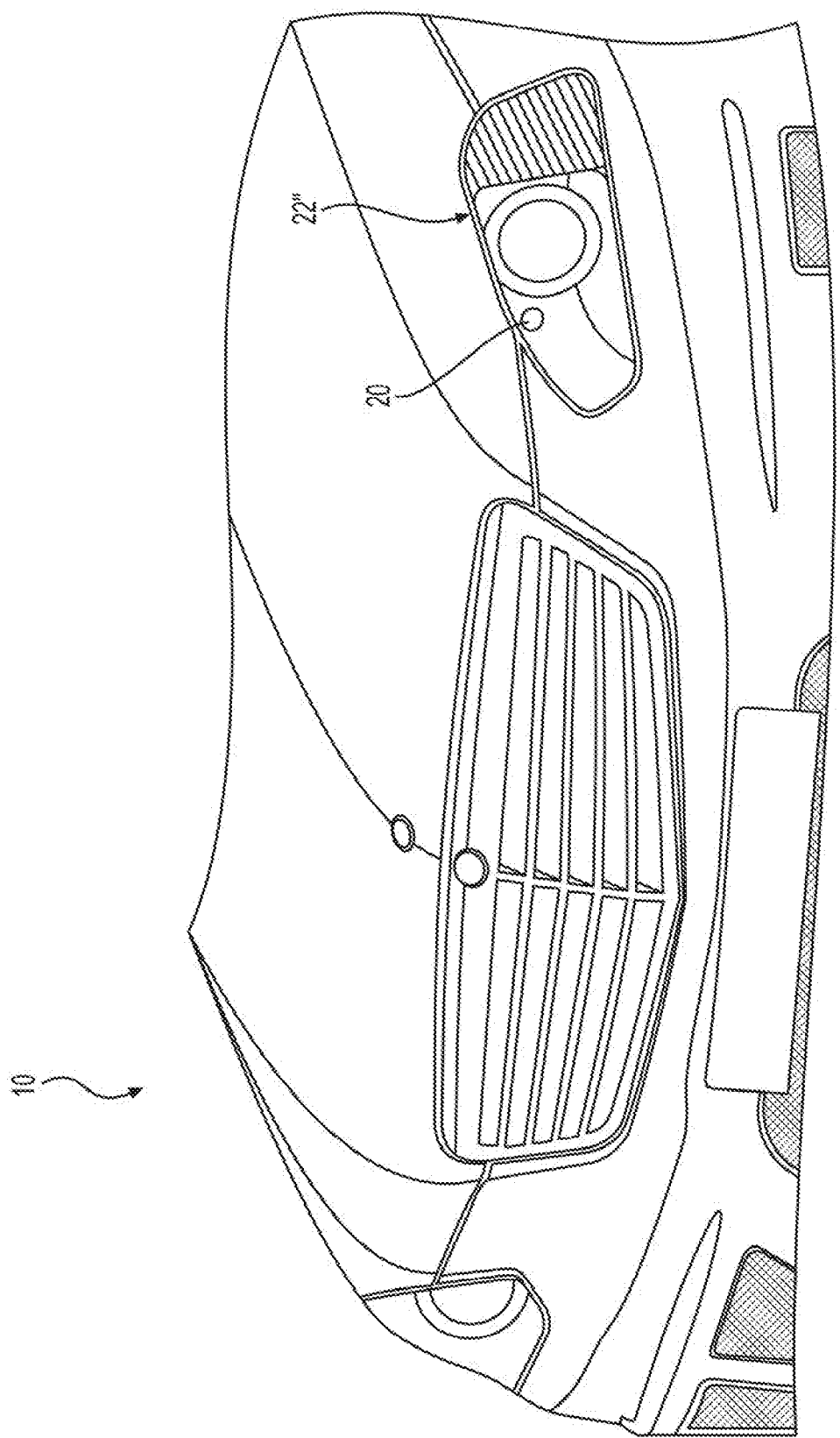
FIG. 2 is a partial front view of the vehicle.

Example embodiments will now be described more fully with reference to the accompanying drawings.

Several example embodiments of a holographic display device are provided so that this disclosure will be thorough, and will fully convey the scope to those who are skilled in the art. Numerous specific details are set forth such as examples of specific components, devices, and methods to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Recurring features are marked with identical reference numerals in the figures, in which an example embodiment of a holographic display device 20 presenting a holographic image 32 within an external part 22 for a vehicle 10 is disclosed. An external part 22 is a component that is exposed to the outside space around the vehicle 10. For example, external part 22 may be a headlight assembly, a fog lamp assembly, a rear taillight assembly, a door with a transparent strip, a front grille, a side rear view mirror, or may be provided as a standalone unit. Also, holographic display device 20 may be provided in an inside rearview mirror, an inside brake light, an inside illumination device, or the like component disposed in an interior of the vehicle 10, as but non-limiting examples. The holographic display device 20 of the present disclosure is preferably configured for view by a person outside of the vehicle 10 and may be used functional and/or for purely ornamental purposes. For example, the holographic display device 20 may be functional to present signaling images such as a turn signal or to indicate that an alarm system is enabled. Holographic display device 20 may display alert users that their ride sharing vehicle has arrived. For example BCM 108 may include a telecommunication network interface in communication with a remote server for receiving ride share information from a cellular phone of a user 49, and a GPS position determining module used for determining the position of the vehicle 10 relative to the user 49. Holographic display 20 can be used to display advertisements. Headlight assembly 22 can be advertising space that companies pay/bid for. Ads can also be made by the driver to market their own products or business.

As shown in FIGS. 6-9, the external part 22 includes an outer cover 24 defining an interior cavity 26. The outer cover 24 includes a transparent portion 28, such as a window, for allowing a viewer located outside of the vehicle 10 to see into the interior cavity 26. A presentation surface 30 is disposed within the interior cavity 26 and illuminated by an image source 34 to display the holographic image 32, appearing as a 3-dimensional object within the interior cavity 26. The presentation surface 30 may be a reflective or diffracting surface, which is semi-transparent or optically transparent. Image source 34 may be an LCD, LED, DLP projection, MEMS Laser Projection type device. The presentation surface 30 may be integrally formed with the transparent portion 28. For example, the presentation surface 30 may be disposed with the transparent portion 28 and illuminated by an image source 34 to present a holographic image visible through the transparent portion of the outer cover 24, such as transparent portion 28. For example presentation surface 30 may be provided on the interior facing surface of the transparent portion 28, or may be a layer disposed between an interior facing surface and an exterior facing layer of the transparent portion 28, or may be provided on the exterior facing surface of the transparent portion 28, or the transparent portion 28 may itself be the presentation surface 30. An image projected onto or reflected from such a presentation surface 30 would seem to be suspended relative to the other components in the external part 22. Holographic device 20 may also be configured to generate a 3-D image exterior external part 22, such as on the transparent cover 28 or on an adjacent external vehicle part.

The image source 34 could be a DLP or similar projector. A simple (non-moving) image source 34 implementation would include a single light source 50, such as an LED, with a screened image prior to a lens stack which would project a single image onto the presentation surface 30, which would appear to be suspended in front of the other components in the external part 22 assembly. The holographic image 32 could have motion. For example, the image source 34 may use organic light-emitting diodes (OLED) or liquid crystal display (LCD) to display video and/or two or more different still images. Alternatively, an illusion of motion could be accomplished fixed images with multiple different light sources 50. Activating different ones of the light sources 50 would project the different images 32 onto the presentation surface 30, giving the illusion of motion.

The holographic image 32 may include a logo, symbol, or other graphic. Information, such as text or symbols can also be displayed. For example, the holographic image 32 may take the form of a blinking arrow when a corresponding turn signal is engaged, or the logo of an OEM manufacturer.

Figure 3:
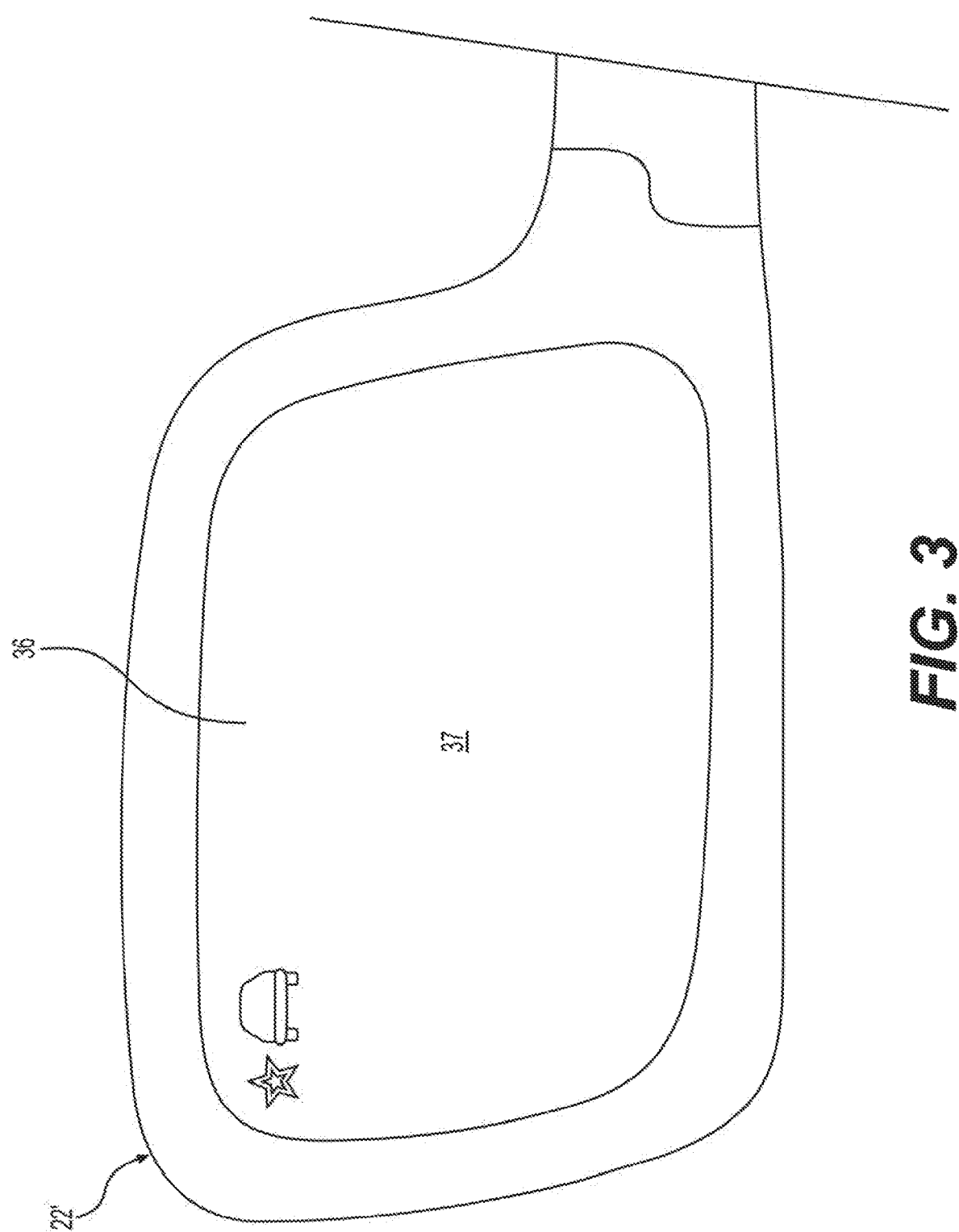
FIG. 3 is a view of an exterior rearview mirror assembly of the vehicle.

The external part 22 including the holographic display device 20 may be an exterior rearview mirror assembly 22', as illustrated in FIG. 3. Holographic display device 20 may be configured to display a unique barcode or NFC code from the side mirror 22, which a vendor, such as a coffee drive through attendant can scan the side mirror 22 in order to facilitate a purchase.

Alternatively or additionally, the external part 22 may be a headlight assembly 22" as shown in FIGS. 2, 4, and 5A-5C.

Figure 6:
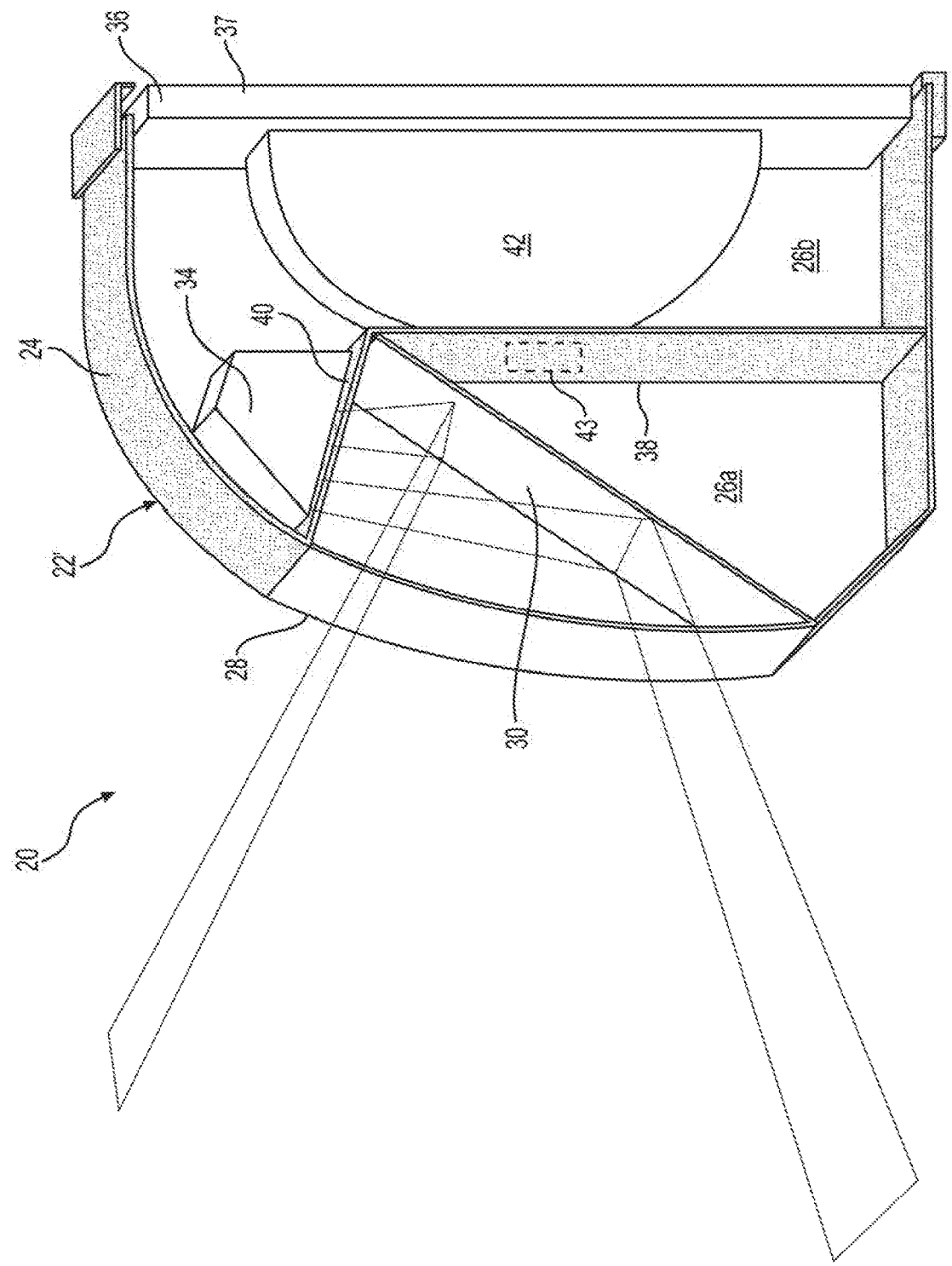
FIG. 6 is a cut-away side view of a holographic display device within an exterior rearview mirror assembly.

As illustrated in FIG. 6, the exterior rearview mirror assembly 22' includes a mirror 36 having a reflective surface 37 opposite the interior cavity 26. A shield panel 38 of opaque material extends generally vertically behind the presentation surface 30 opposite the outer cover 24 to divide the interior cavity 26 into a first chamber 26a, which is visible to a viewer through the outer cover 24, and a second chamber 26b not visible through the outer cover 24. A ledge 40 is disposed above the shield panel 38 and extends generally transversely thereto to partially enclose the first chamber 26a and to support the image source 34 thereupon. A tilting mechanism 42 is disposed within the second chamber 26b between the presentation surface 30 and the mirror 36 for holding the mirror 36 in a range of different positions. The tilting mechanism 42 may include one or more motors and/or mechanical components for controlling the position of the mirror 36 and for holding the mirror 36 in a given position. In some embodiments, and as shown in FIG. 6, the tilting mechanism 42 and/or the mirror 36 may be supported upon the shield panel 38. The shield panel 38 may define a connection region 43 where the tilting mechanism 42 is physically attached. The tilting mechanism 42 may be attached to the connection region 43 of the shield panel 38 using one or more different attachment means, such as adhesive, fasteners, and/or structures such as a tongue-and-groove or a latching tab disposed upon one or both of the tilting mechanism 42 and/or the shield panel 38.

Figure 4:
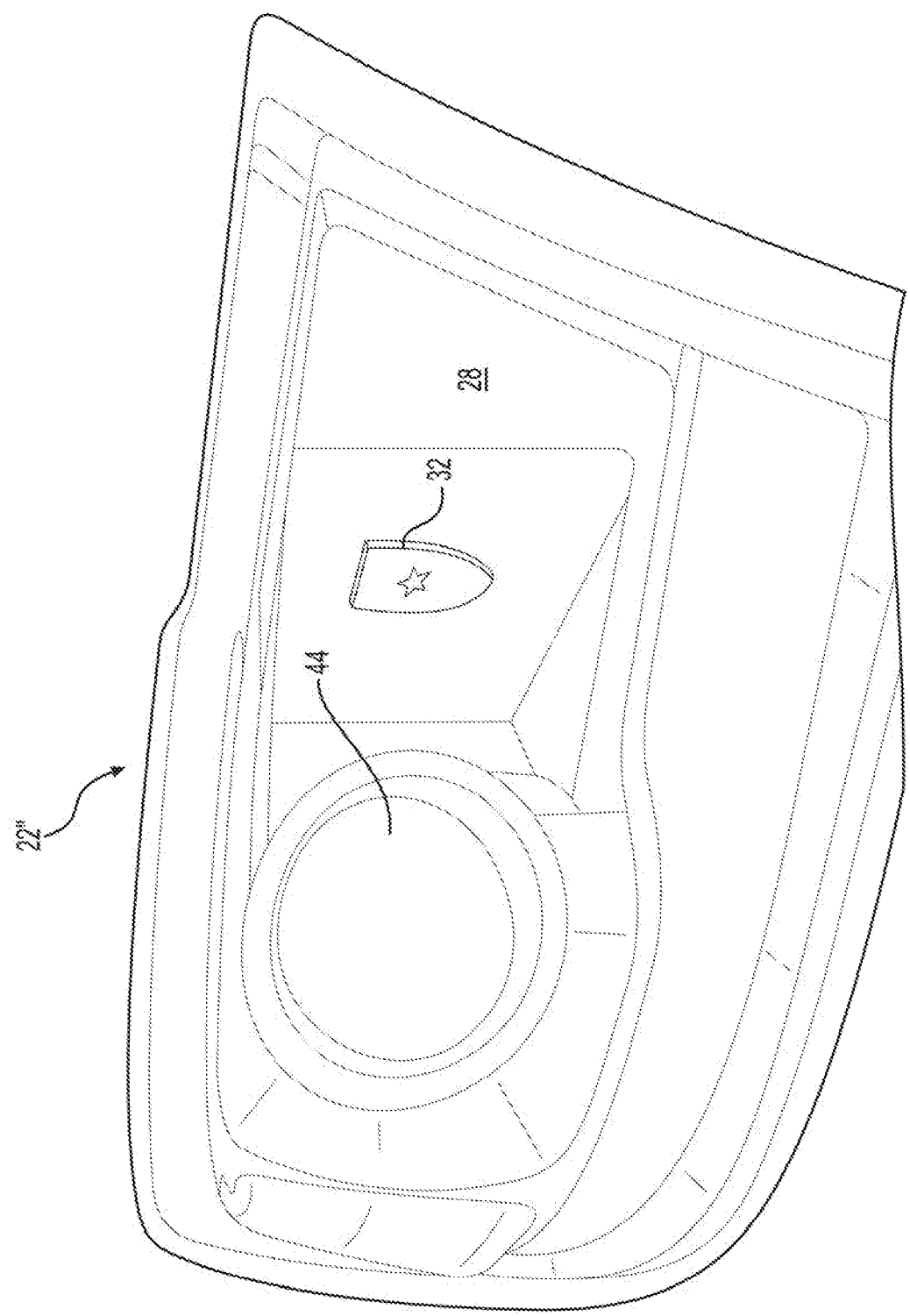
FIG. 4 is a front view of a headlight assembly including a holographic display.
Figure 5A:
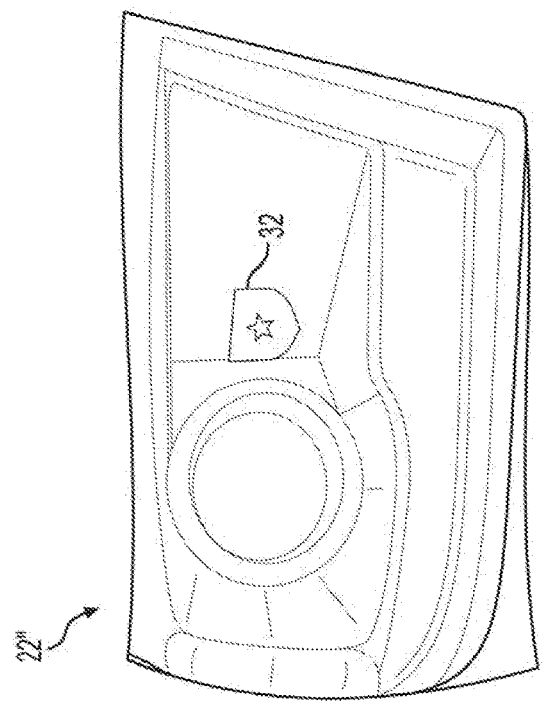
FIG. 5A is front view of a headlight assembly including a holographic display showing a holographic image in a first position.
Figure 5B:
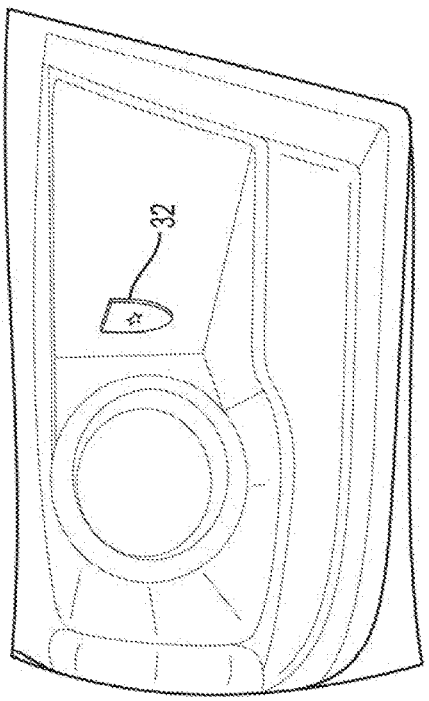
FIG. 5B is front view of the headlight assembly including the holographic display showing the holographic image in a second position rotated from the first position.
Figure 5C:
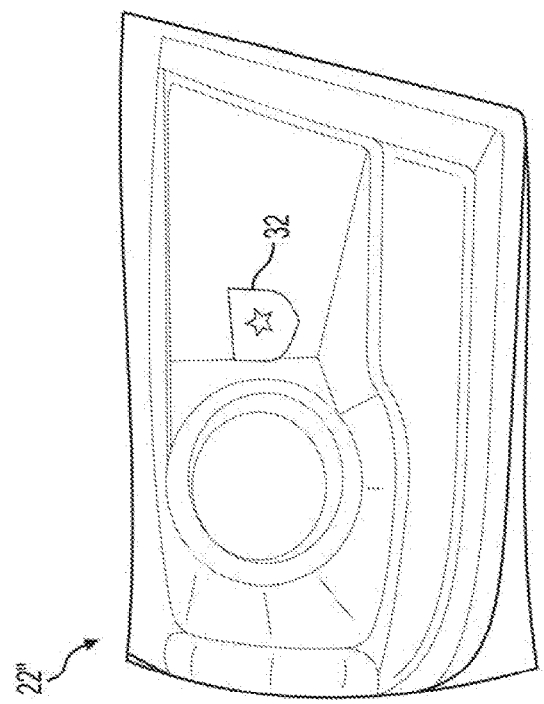
FIG. 5C is front view of the headlight assembly including the holographic display showing the holographic image in a third position further rotated from the second position.
Figure 5D:
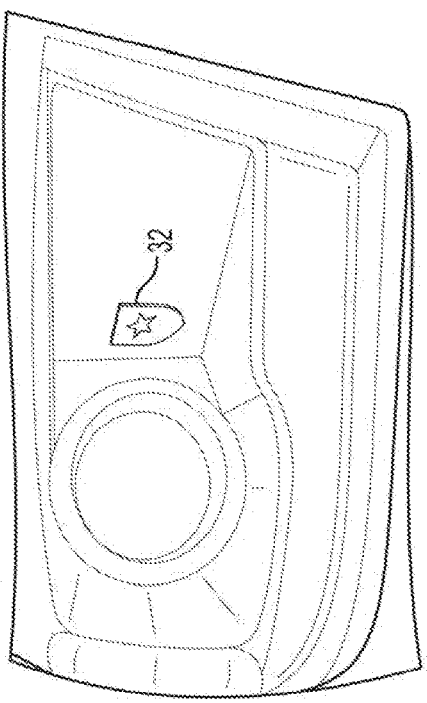
FIG. 5D is front view of the headlight assembly including the holographic display showing the holographic image in a fourth position further rotated from the third position.
Figure 7:
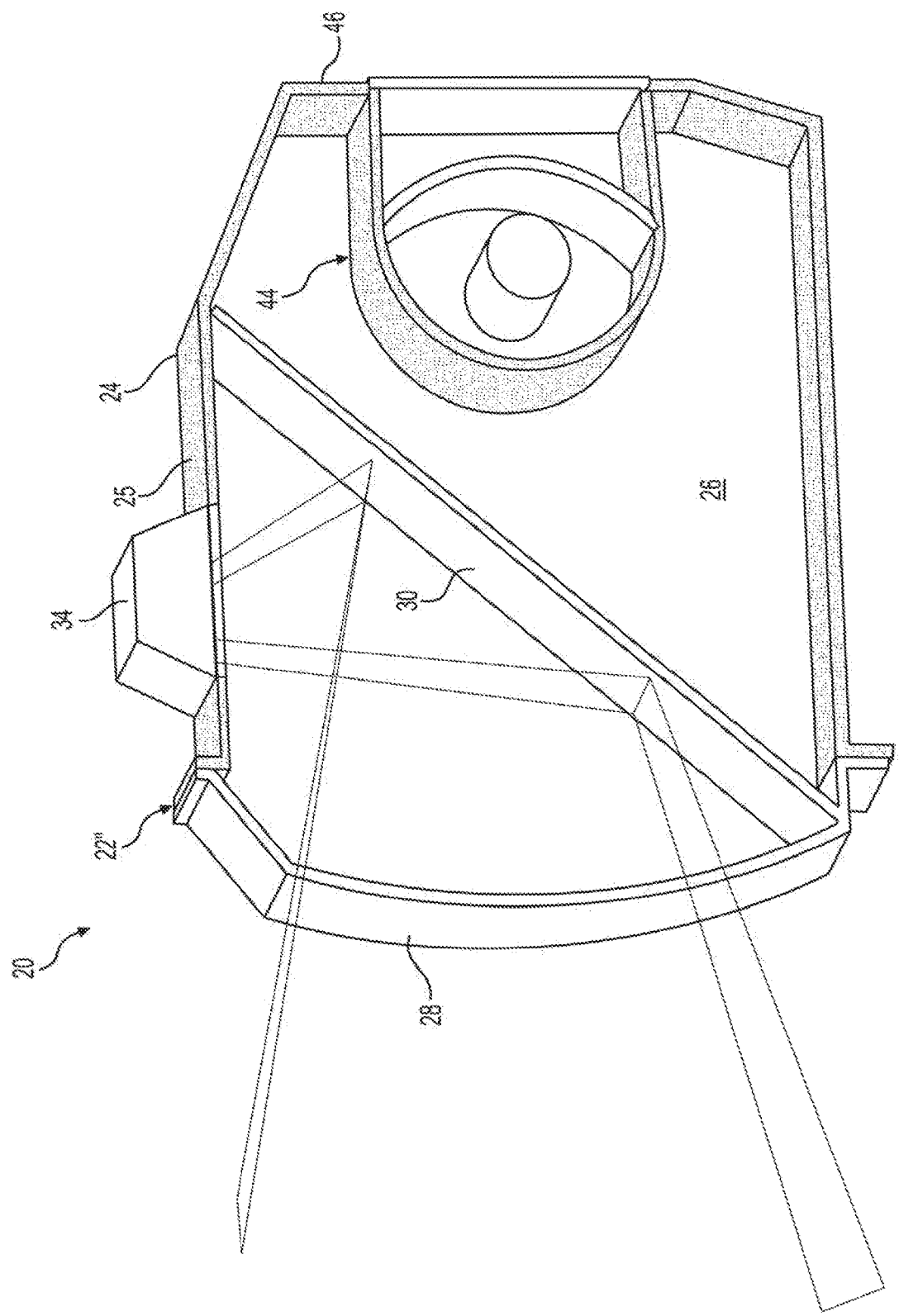
FIG. 7 is a cut-away side view of an embodiment for a holographic display device within a headlight assembly.

As illustrated in FIG. 7, the headlight assembly 22" further includes an illumination source 44 disposed on a back wall 46 of the outer cover 24 opposite the transparent portion 28. The illumination source 44 may be a high-intensity source for illuminating an area in front of the vehicle 10. The illumination source 44 may include a halogen or HID bulb, although other high-intensity light sources 106 may be used such as, for example, one or more LEDs or lasers. The illumination source 44 may include one or more reflectors, lenses, bulbs, and/or other associated hardware. In some embodiments, and as also shown in FIG. 7, the outer cover 24 defines an exterior surface 25 opposite the interior cavity 26, and the image source 34 is disposed upon the exterior surface 25 of the outer cover 24 and outside of the interior cavity 26. The illumination source 44 may be configured to project light not through the presentation surface 30, for example when the illumination source 44 is provided next to or adjacent the presentation surface 30, for example as shown in FIG. 4-5D. Alternatively, or additionally, the illumination source 44 may be configured to project light 45 through the presentation surface 30, and onwards through transparent portion 28 for example when the illumination source 44 is provided behind the presentation surface 30, for example as shown in FIG. 7C.

Figure 7A:
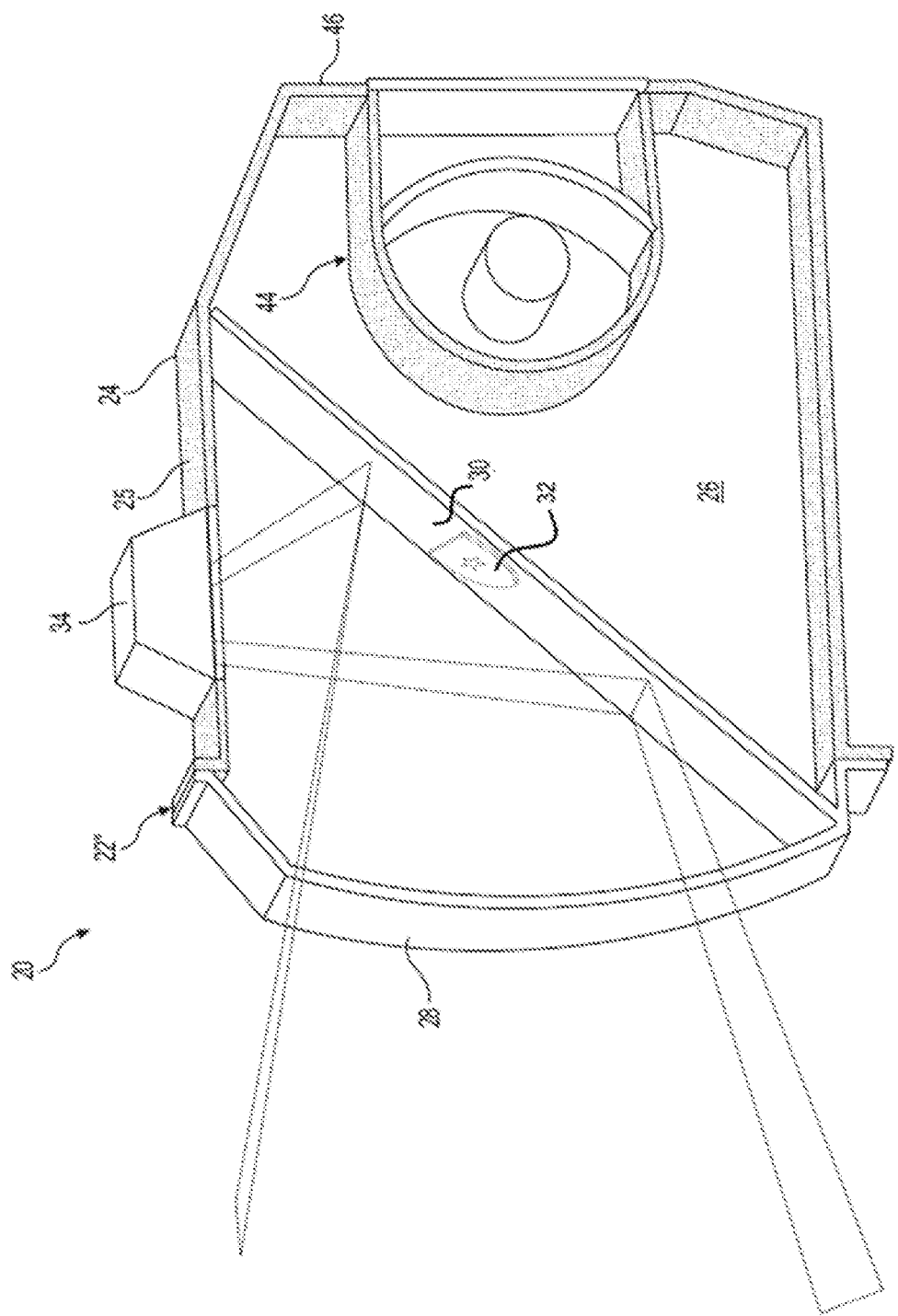
FIG. 7A is a cut-away side view of an embodiment for a holographic display device within a headlight assembly illustrating an image presented on a presentation surface, in accordance with an illustrative embodiment.
Figure 7B:
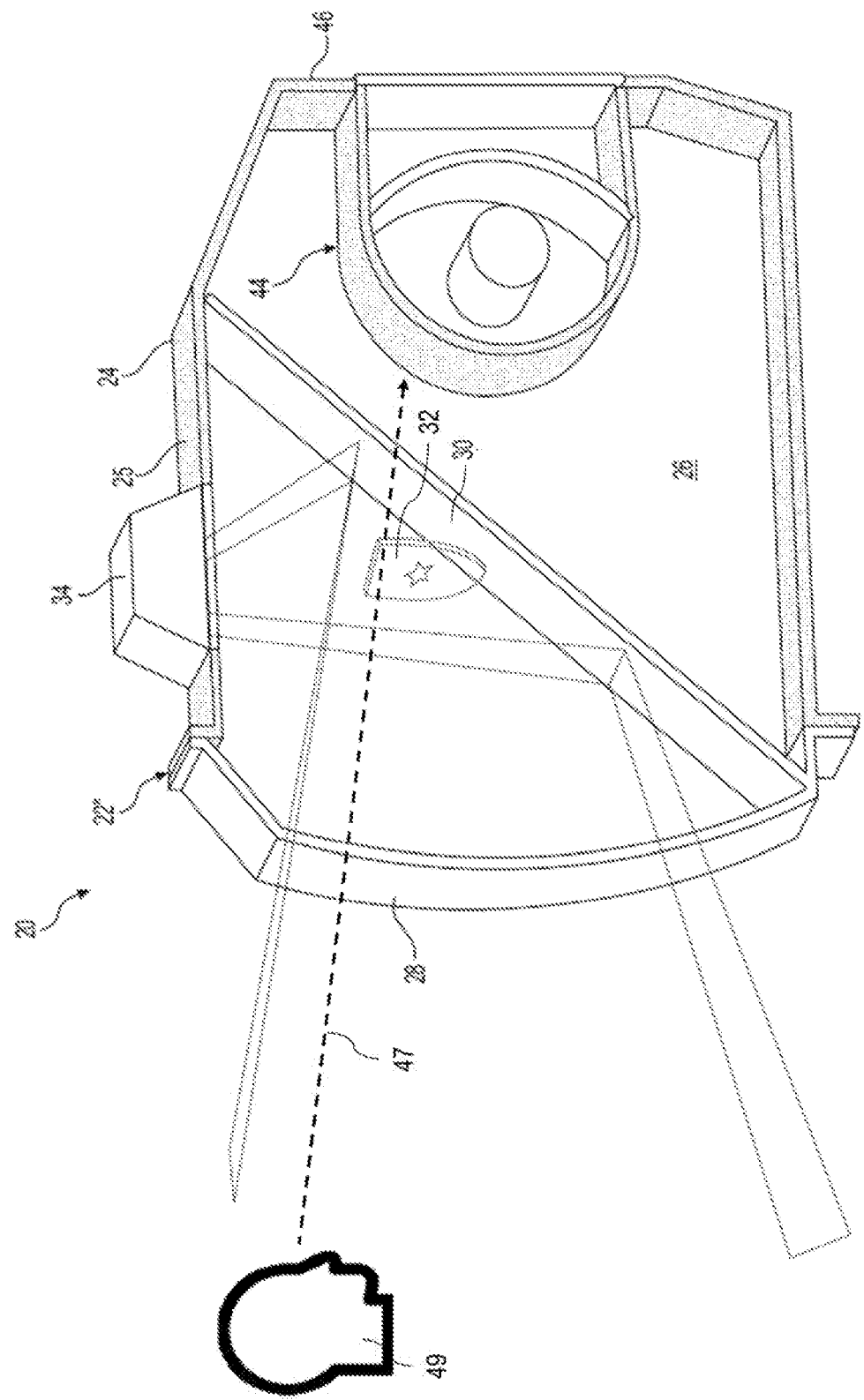
FIG. 7B is a cut-away side view of an embodiment for a holographic display device within a headlight assembly illustrating an 3-D image viewed by an exterior viewer of the image presented on the presentation surface of FIG. 7A, in accordance with an illustrative embodiment.
Figure 7C:
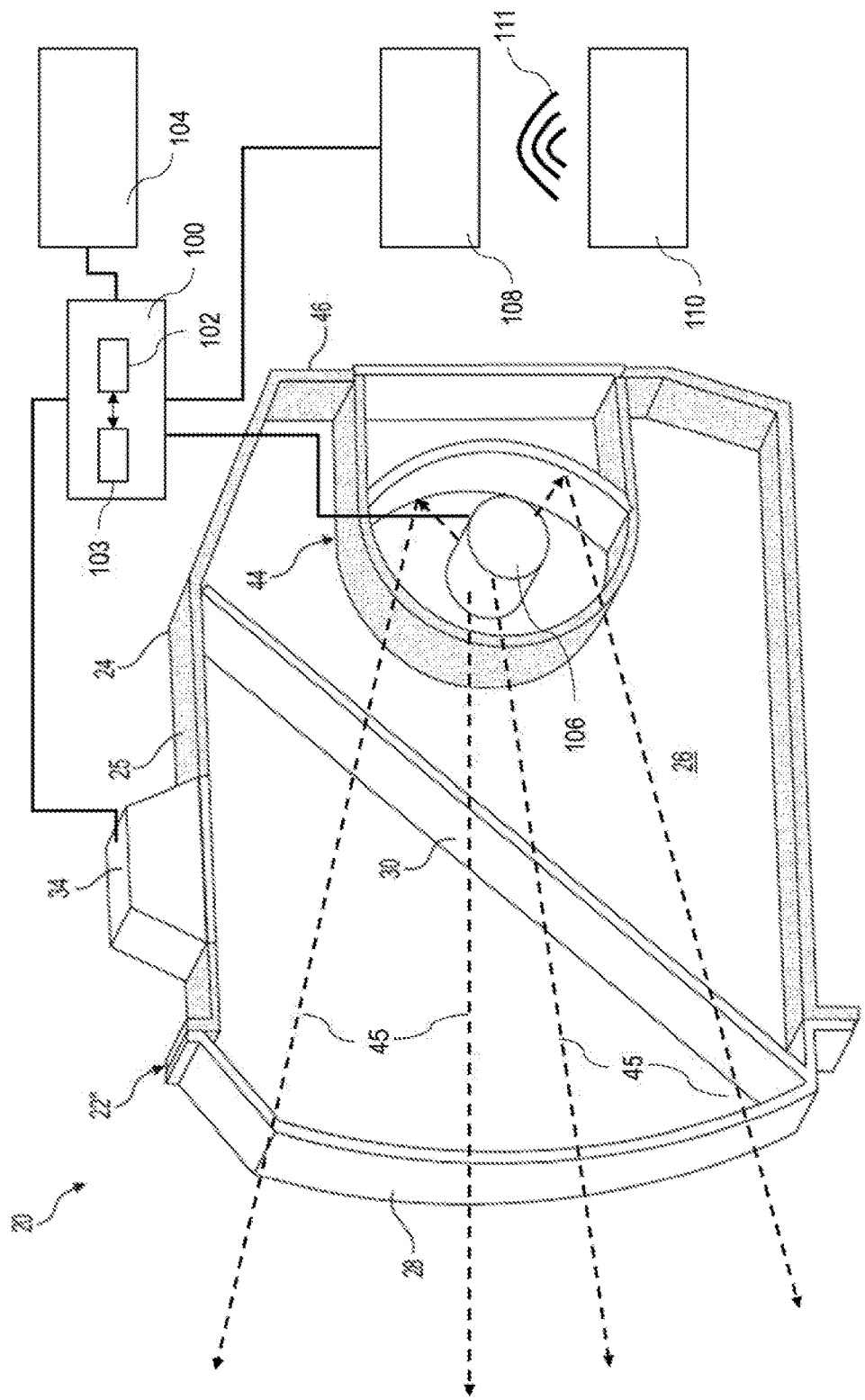
FIG. 7C is a cut-away side view of an embodiment for a holographic display device within a headlight assembly illustrating an image source deactivated, and a illumination source activated, in accordance with an illustrative embodiment.

With reference to FIG. 7C, image source 34 is in electrical communication with a controller 100 including a processer unit 102 and a memory 103 for storing instructions such as those represented by the methods and flowcharts described herein below and image information or data for execution and/or processing by the processor unit 102 for controlling the light or image output of the image source 34. Controller 100 may be provided local or internal the device 20, or external and/or remote the device 20, as examples. A power source 104 is in electrical communication with controller 100 for powering the controller 100 and the image source 34. Power source 110 may also be in direct electrical communication with the image source 34. Controller 100 may also be in electrical communication with light generating element 106 of illumination source 44, such as an incandescent source, halogen bulb, an LED light source, or the like for producing light 45 for the external part 22, for example if the external part 22 is a headlight assembly, light generating element 106 may produce the light 45 for the low beam, high beam, blinker, stop light, hazard light output and the like as an example. The control and power structure and interconnections described with reference to FIG. 7C may apply to the image source 34 and configurations of the other Figures.

When external part 22 is a rear view mirror assembly, for example light generating element 106 may generate the light for the blinder mounted in the rear view side mirror assembly. Controller 100 may be in electrical communication with a vehicle system, such as a Body Control Module 108, also known as a "BCM" and receive commands from the BCM 108 instructing controller 100 to operate the image source 34 and/or the illumination source 44. Other configurations are possible for example whereby BCM 108 directly controls illumination source 44. BCM 108 may implement a wireless or remote access and/or authentication system including for example a wireless key FOB 110 carried by user 49. BCM 108 may be configured to control or instruct controller 100 to control image source 34 in response to detecting key FOB 110 approaching the vehicle 10 and BCM 108 detecting a wirelessly transmitted signal 111 from FOB 110 for example, in a manner as described herein below.

FIG. 7A illustrates in accordance with an example the presented holographic image 32 on the presentment surface 30, while FIG. 7B illustrates an example of a three dimensional appearance of the holographic image 32 as viewed from the perspective of an external viewer. The viewer will perceive the holographic image 32 without perceiving the image source 34, for example as a result of the image source 34 being out of a line of sight 47, for example as a result of being provided on a top portion of the cover 24, of an external viewer 49, whereas illumination source 44 and other components provided on the back wall 46 for example, may be able to be viewed by the viewer 49, as shown in FIG. 7B for example. Image source 34 may alternatively be provided on the back wall 46.

According to an aspect, the presentation surface 30 may include the image source 34. For example, the image source 34 may be a transparent organic light-emitting device (TOLED) 34a to illuminate and to display the holographic image 32 thereupon, as illustratively shown in FIG. 8A. Transparent organic light-emitting device (TOLED) 34a may be provided with the presentation surface 30, for example as support by, disposed on, integrated with, or position on. Transparent organic light-emitting device (TOLED) 34a may function as the presentation surface 30. As shown in FIG. 8A, transparent organic light-emitting device (TOLED) 34a may be positioned within the inner cavity 26 between the outer cover 24 and the illumination source 44. Transparent organic light-emitting device (TOLED) 34a may be transparent to light 45 emitted by illumination source 44, and may be transparent, for example not visible, to an exterior viewer 49 when transparent organic light-emitting device (TOLED) 34a is not controlled by controller 100 to display holographic image 32. Alternatively, and as illustrated in FIGS. 6-9, the image source 34 may be spaced apart from the presentation surface 30 and configured to project the holographic image 32 as a hologram thereupon. Other types of transparent screens may be provided, such as an LCD or an LED transparent screen. In accordance with another embodiment, transparent organic light-emitting device (TOLED) 34a may be substituted for a parallax barrier and a screen that displays two pictures by alternating columns of pixels, for generating a pseudo 3D image which can be achieved at specific viewing locations and angles. In another embodiment, transparent organic light-emitting device (TOLED) 34a may be substituted a photoactive film (like a quantum dot film) to produce holograms, and image source 34 replaced with an invisible light e.g. UV or IR. In accordance with another embodiment, transparent organic light-emitting device (TOLED) 34a may be substituted with a guide/reflector enabled puddle style hologram whereby illumination source 44 provides light which is reflecting it into a stenciled screen (similar to a puddle light) as a replacement to a separate image source 34 and the transparent organic light-emitting device (TOLED) 34a.

Figure 8:
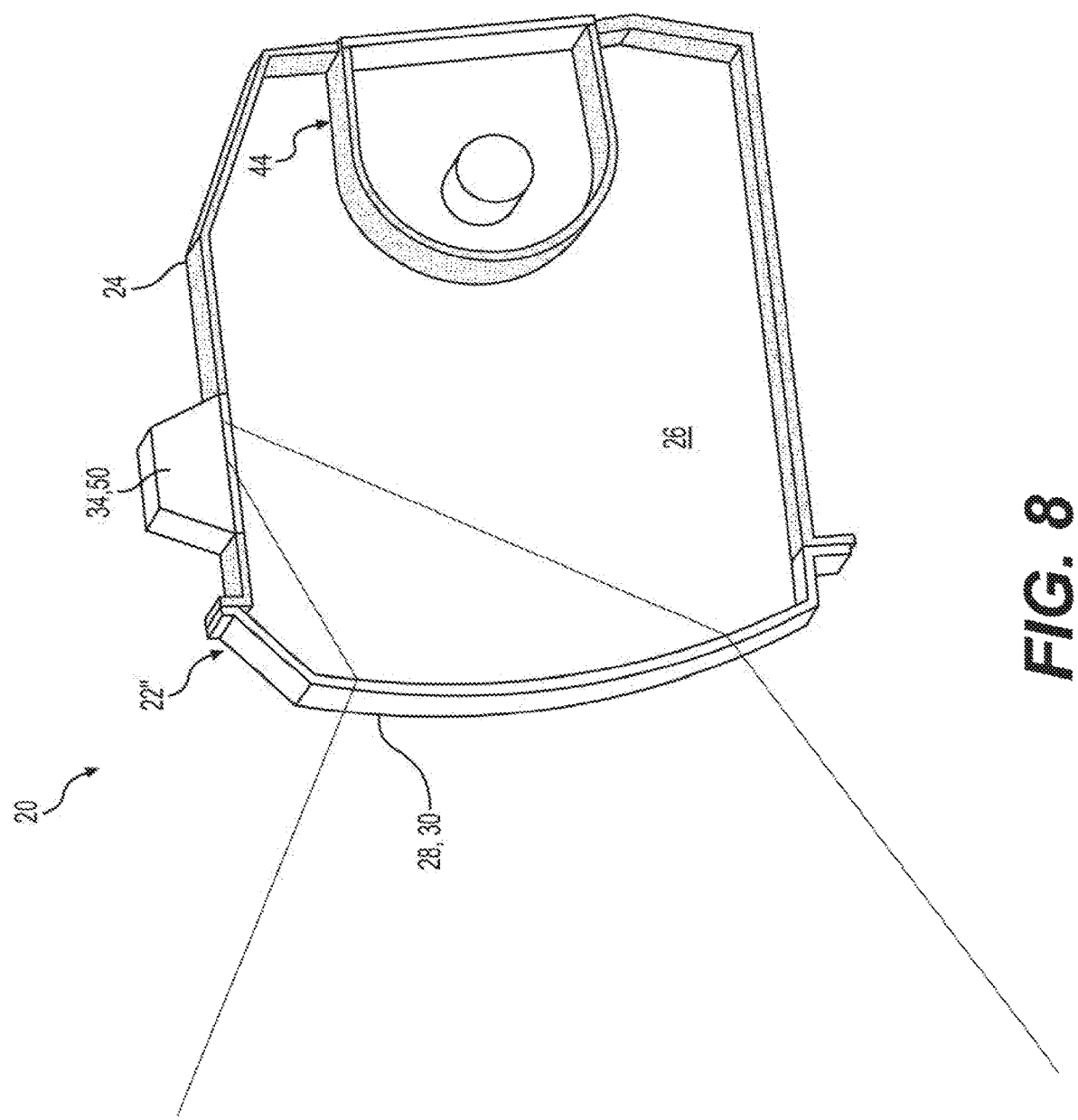
FIG. 8 is a cut-away side view of another embodiment for a holographic display device within a headlight assembly.
Figure 8A:
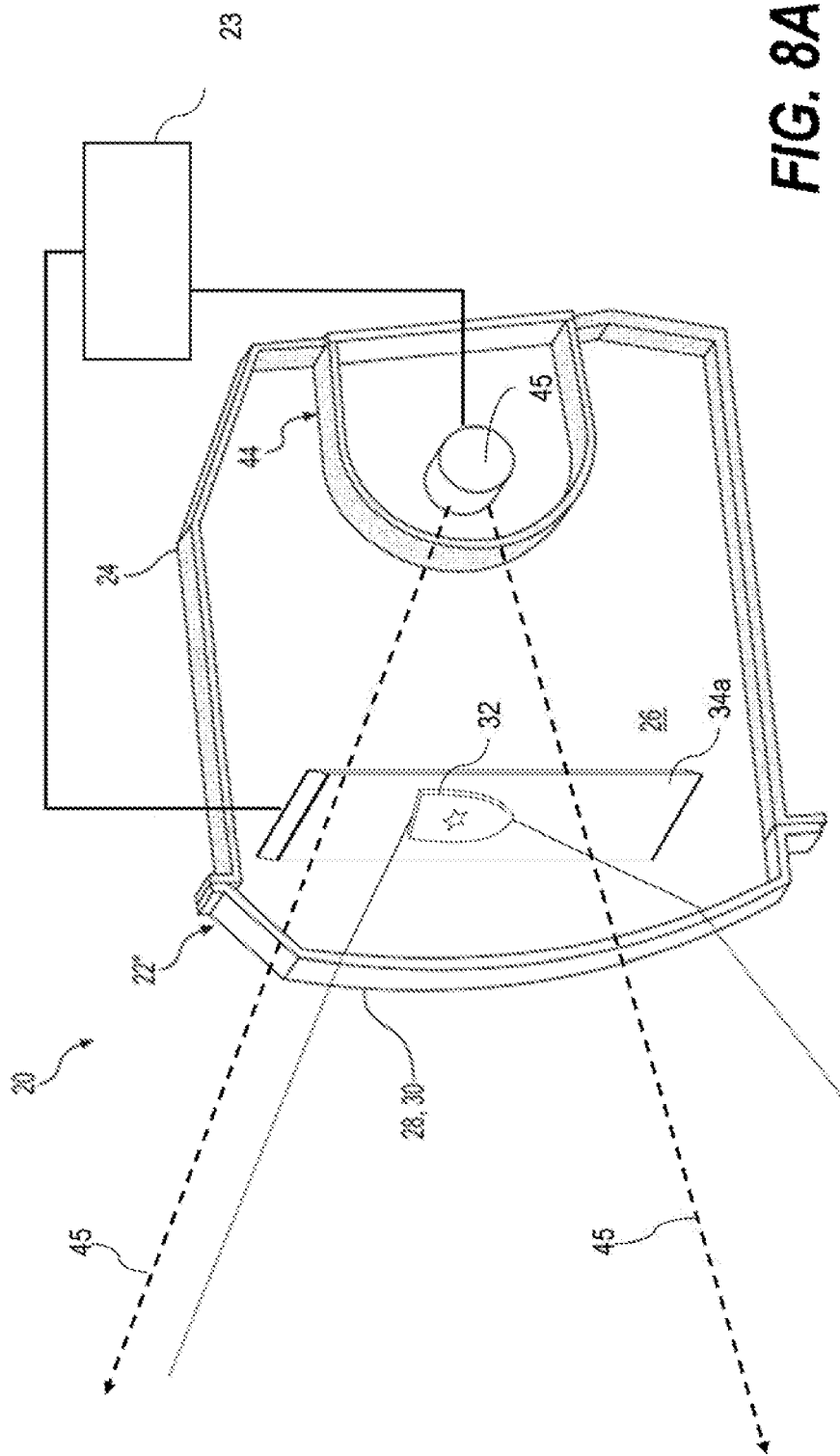
FIG. 8A is a cut-away side view of another embodiment for a holographic display device within a headlight assembly.

As shown in FIG. 8, the transparent portion 28 may include the presentation surface 30. Such a configuration may include the transparent portion 28 being optically transparent to most visible light but having an increased diffraction of certain wavelengths of light. The transparent portion 28 may include, for example, a coating of specific particles or having variations in geometry so that either light from a certain angle or of a certain wavelength is diffracted such that it functions as the presentation surface 30, providing the illusion of having an image with no observable image source.

The image source 34 may be not directly viewable from normal viewing positions outside of the external part 22. For example, the image source 34 could be positioned at an angle that is difficult to see from the exterior viewer, while the reflected image 32 would be easily visible.

Figure 9:
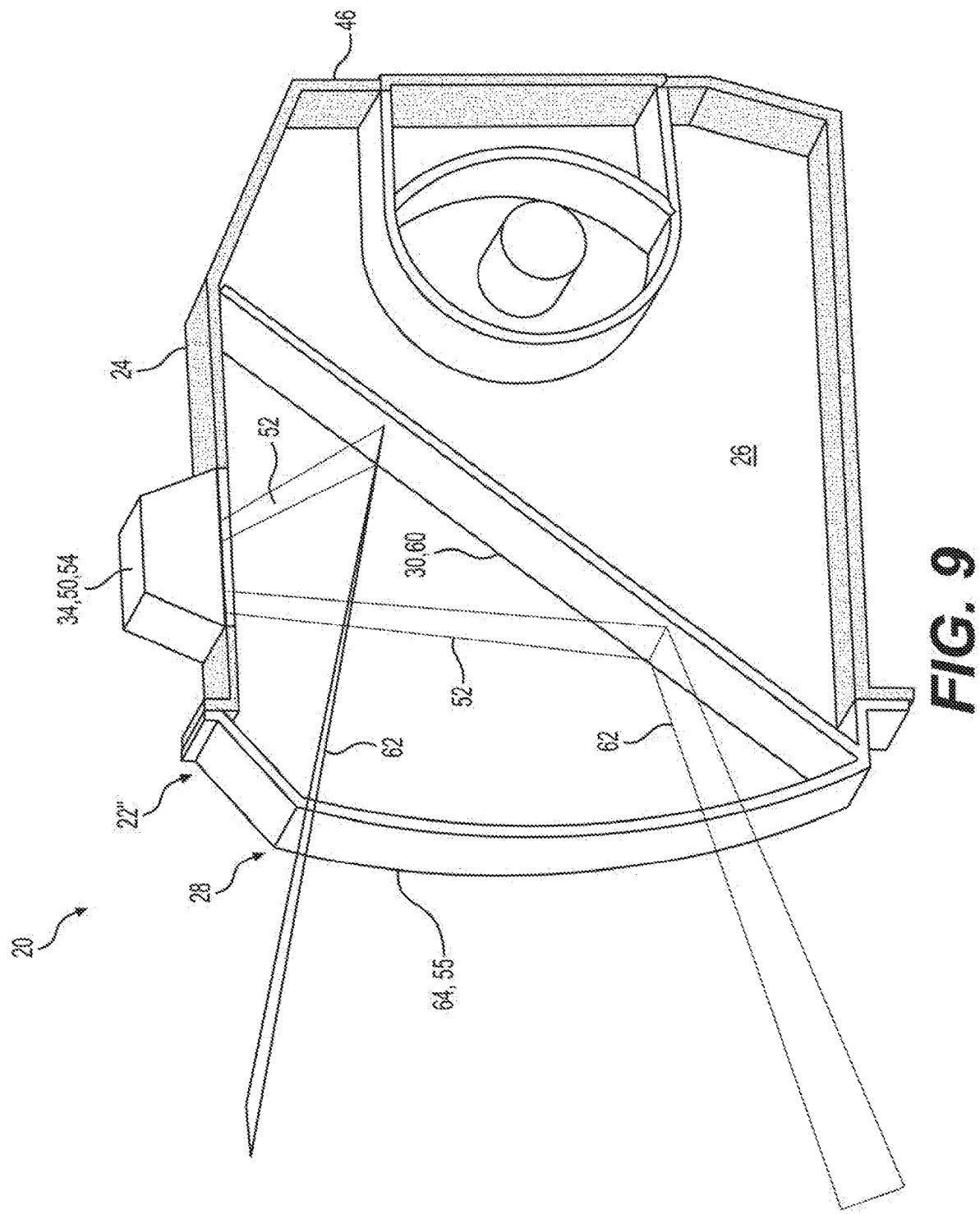
FIG. 9 is a cut-away side view of yet another embodiment for a holographic display device within a headlight assembly.

As shown in FIG. 9, the holographic display device 20 is similar to the device shown in FIG. 7, but configured to prevent the viewer from being able to see the image source 34 using off-polarization. A first polarizer, such as for example a first circular polarizer 54, such as a film provided on an output lens or cover of the image source 34, creates circularly polarized light 75 having a circular polarization in a first direction from the image source 34. That circular polarized light in the first direction is reversed in direction into light 77 of a different polarization that the first polarized light 75 when reflected by a reflective component 60. In the example shown in FIG. 7, the reflective component 60 is on the presentation surface 30. An optical cover 64 is disposed between the reflective component 60 and a viewer and includes a second polarizer, such as for example a second circular polarizer 55 transmissive to light 77 having a circular polarization in the second direction and not transmissive to light 75 having a different polarization, such as for example having a circular polarization in the first direction. Therefore light 75 not undergoing a change in polarization, for example due to interaction with the presentment surface 30 is prevented from passing through the optical cover 64, and is not viewable from the exterior of the external part 22, while light undergoing a change in polarization which is aligned with the polarization of the optical cover 64 is allowed to pass through the optical cover 64 and is viewable from the exterior of the external part 22. The optical cover 64 may be formed on some or all of the transparent portion 28 of the outer cover 24. Circular polarizer 55 may be a film applied to the inner or outer surface of the optical cover 64, for example, or may be integrated with the optical cover 64.

For example, the first circular polarizer 54 may create left-hand (LH) polarized light which is reversed to become right-hand (RH) polarized by reflecting off of the presentation surface 30. The second circular polarizer 55 is configured to block the LH circular polarized light while allowing the RH circular polarized light to pass through. In this way, light transmitted directly from the image source 34 is not visible to the viewer since the left-hand (LH) polarized light is filtered or blocked by the circular polarizer 55, as illustrated in FIG. 10 by the symbol "X", while the holographic image 32 on the presentation surface 30 is visible as being allowed to pass through the circular polarizer 55.

Figure 10:
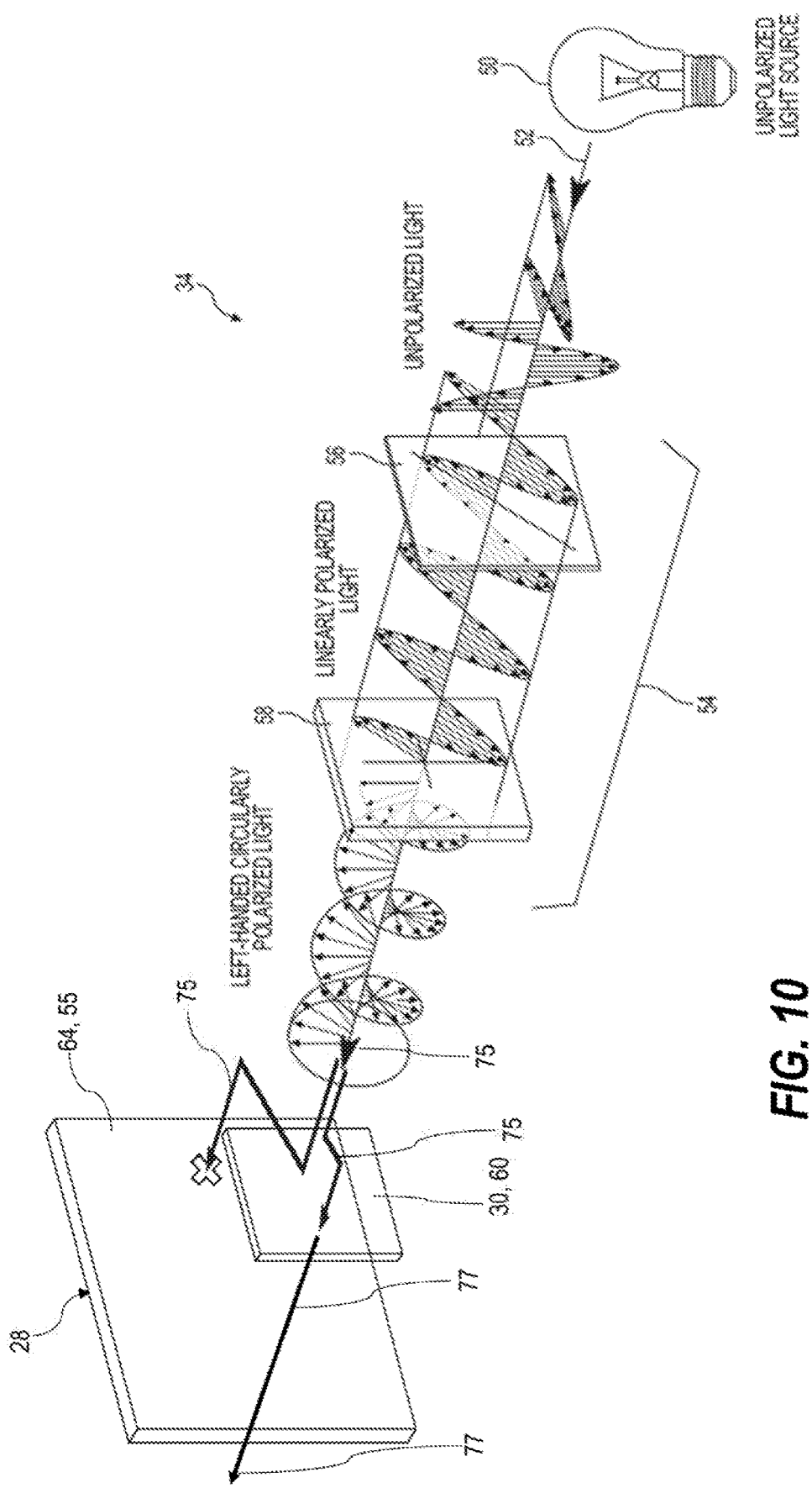
FIG. 10 is a schematic diagram of an image source including a circular polarizer of the holographic display device of FIG. 9.

As shown on FIG. 10, this configuration includes the image source 34 having a light source 50 generating a first beam 52 of unpolarized light. The first circular polarizer 54 includes a linear polarizer 56 and a quarter-wave plate 58 together creating the circularly polarized light having a circular polarization in the first direction from the first beam 52 of unpolarized light. The second circular polarizer 55 includes a similar construction as the first circular polarizer 54 but operates in reverse to pass-through only light 77 having a circular polarization in a given direction.

As shown on FIGS. 11A-11C, the holographic display device 20 may include a transparent portion 28, such as a window, which has multiple angled surfaces or a single rounded surface, and which is configured to present slightly different images on each of the surfaces or a distorted image for a rounded surface. In this way, the holographic image 32 may appear to be 3-dimensional and/or to change depending on the angle from which it is viewed.

Figure 13:
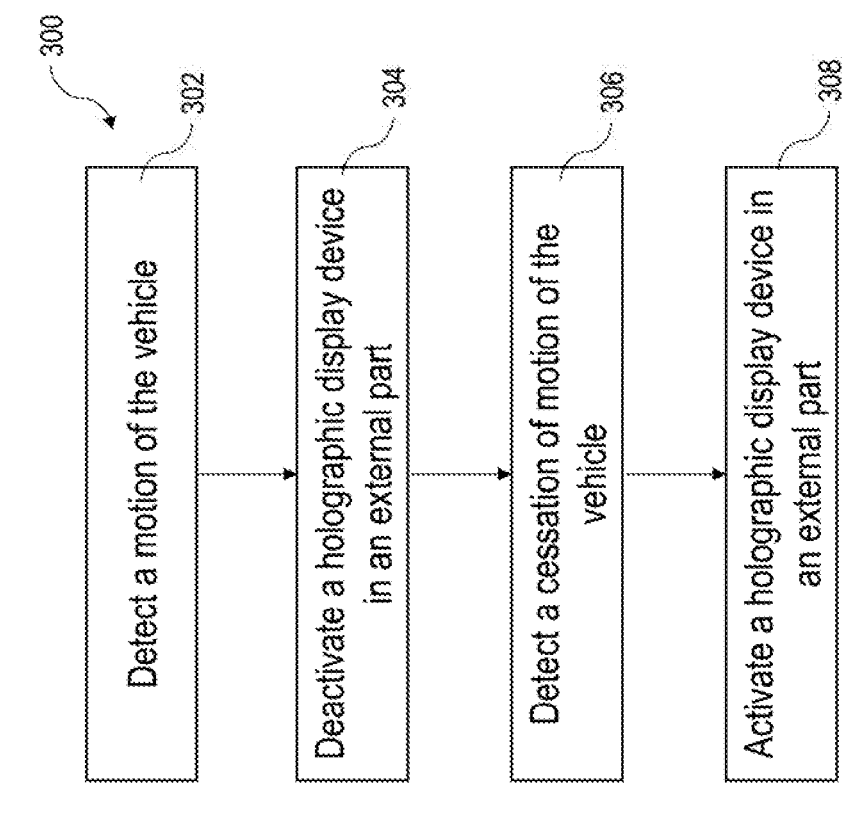
FIG. 13 is another illustrative method of operating a holographic display device.
Figure 12:
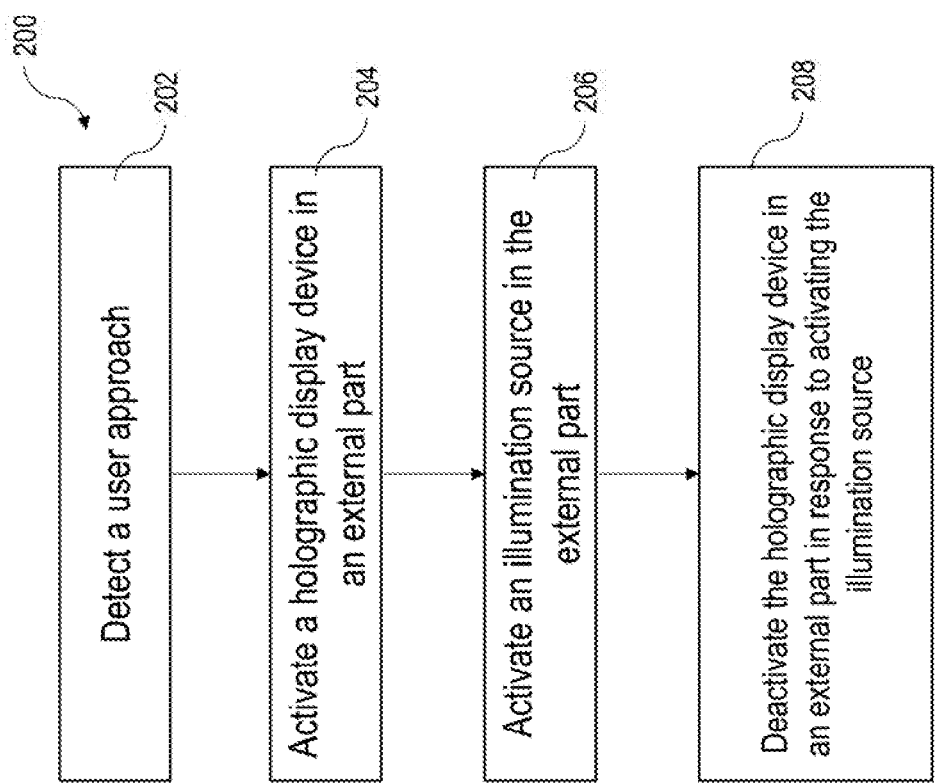
FIG. 12 is an illustrative method of operating a holographic display device.

Now referring to FIG. 12, there is illustrated a method 200 of operating a holographic display device, such as the holographic display device 20 described herein above, including the steps of detecting 202 the approach of a user 49, for example by detecting a FOB 110 using the BCM 108 or controller 100 as described herein and above. Next, the method 200 includes the step of activating 204 the holographic display device 20 to display an image 32 in response to detecting 202 the approach of a user 49, for example presenting a welcoming image such as a driver's name, or a logo, or other information, or images, or text. Next, the method 200 includes the step of activating 206 an illumination source 44 in the external part 22, such as for example by the user 49 turning the engine on, or activating the light switch inside the vehicle 10. Next, the method 200 includes the step of deactivating 208 the holographic display device 20 in the external part in response to activating the illumination source 44. For example, controller 100 may be configured to execute the method steps to control the activation and deactivation of the holographic display device 20 in response to detecting a state of the vehicle 10, such a drive state or moving state which requires the holographic display device 20 be deactivated to not interfere with the operation of the illumination source 44, and which will now be described with reference to FIG. 13. Controller 100 may be configured to execute the method steps of method 200 and method 300 and for example controller 100 may be configured to at step 302 detect a motion of the vehicle, as an example of detecting a state of the vehicle, and in response at step 304 deactivate the holographic display device 20, and at step 306 detect a cessation of motion of the vehicle, for example the vehicle in a stopped state, or an engine off state, and at step 308 in response to detecting at step 306, to control the activation or reactivation after the deactivation of the holographic display device 20 in response to detecting a state of the vehicle, such as a stopped state which can allow the holographic display device 20 to be activated without causing interference with the illumination source 44 and conform with automotive safety legislation and regulations.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An external part for a vehicle comprising:
a holographic display device including an image source and a reflective component configured to present a holographic image within the external part;
the image source including a light source generating a first beam of unpolarized light;
a first circular polarizer including a linear polarizer and a quarter-wave plate together creating circularly polarized light having a circular polarization in a first direction from the first beam of unpolarized light;
the reflective component configured to reflect the circularly polarized light from the first circular polarizer to a second beam having a circular polarization in a second direction opposite the first direction; and
an optical cover disposed between the reflective component and a viewer, the optical cover including a second circular polarizer transmissive to light having a circular polarization in the second direction and not transmissive to light having a circular polarization in the first direction.

2. The external part for a vehicle as set forth in claim 1, wherein the holographic image appears as a 3-dimensional object.

3. The external part for a vehicle as set forth in claim 1, wherein the external part is an exterior rearview mirror assembly.

4. The external part for a vehicle as set forth in claim 1, wherein the external part is a headlight assembly.

5. The external part for a vehicle as set forth in claim 4, wherein the headlight assembly further includes an illumination source disposed on a back wall of an outer cover opposite a transparent portion of the headlight assembly.

6. The external part for a vehicle as set forth in claim 1, wherein the holographic display device comprises a presentation surface disposed within an interior cavity of the holographic display device and illuminated by the image source to present the holographic image visible through the optical cover.

7. The external part of a vehicle as set forth in claim 6, wherein the reflective component is at the presentation surface.

8. The external part for a vehicle as set forth in claim 1, wherein the image source comprises a transparent organic light-emitting device configured to illuminate and to display the holographic image.

9. The external part for a vehicle as set forth in claim 8, wherein the transparent organic light-emitting device is disposed at a presentation surface within an interior cavity of the holographic display device.

10. The external part for a vehicle as set forth in claim 1, wherein the image source is spaced apart from a presentation surface within an interior cavity of the holographic display device, and wherein the image source is configured to project the holographic image onto the presentation surface.

11. The external part of a vehicle as set forth in claim 10, wherein the reflective component is at the presentation surface.

* * * * *